C. F. SHANKS.
MILLING AND BORING MACHINE.
APPLICATION FILED NOV. 15, 1911.

1,022,051.

Patented Apr. 2, 1912.

3 SHEETS—SHEET 1.

C. F. SHANKS.
MILLING AND BORING MACHINE.
APPLICATION FILED NOV. 15, 1911.

1,022,051.

Patented Apr. 2, 1912.
3 SHEETS—SHEET 3.

Witnesses:

Inventor:
Charles Frederick Shanks,

UNITED STATES PATENT OFFICE.

CHARLES FREDERICK SHANKS, OF JOHNSTONE, SCOTLAND.

MILLING AND BORING MACHINE.

1,022,051. Specification of Letters Patent. Patented Apr. 2, 1912.

Application filed November 15, 1911. Serial No. 660,356.

*To all whom it may concern:*

Be it known that I, CHARLES FREDERICK SHANKS, a subject of the King of the United Kingdom of Great Britain and Ireland, and residing at Johnstone, Renfrewshire, Scotland, have invented a certain new and useful Improvement in Milling and Boring Machines, of which the following is a specification.

This invention relates to an improved machine for milling and boring purposes, particularly applicable for milling and boring turbine casings.

The invention has for its object to provide a machine equipped with two milling cutter wheels or sets of cutter wheels preferably disposed in a line or lines substantially or presumably at right angles to the direction of travel and coaxially with each of which wheels or one of each set of wheels is disposed a boring device for a purpose hereinafter referred to.

Figure 1:
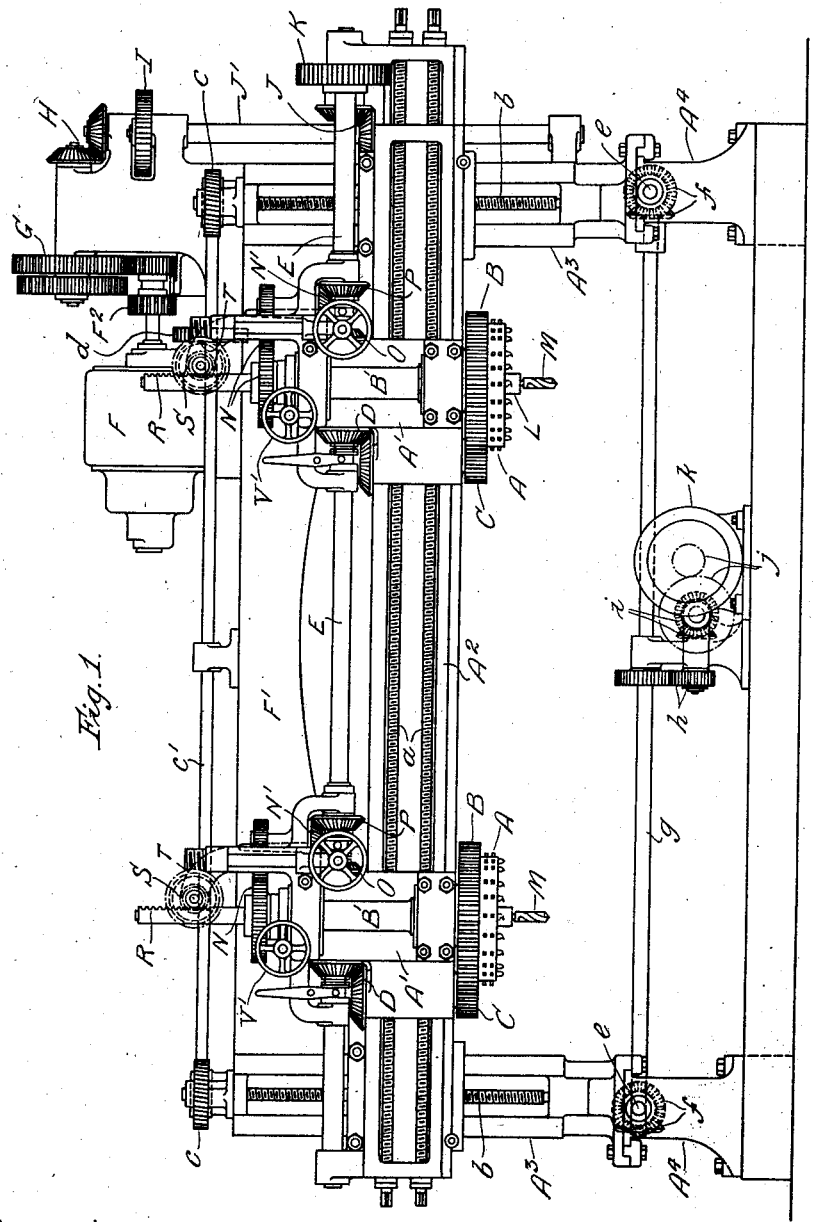
Figure 2:
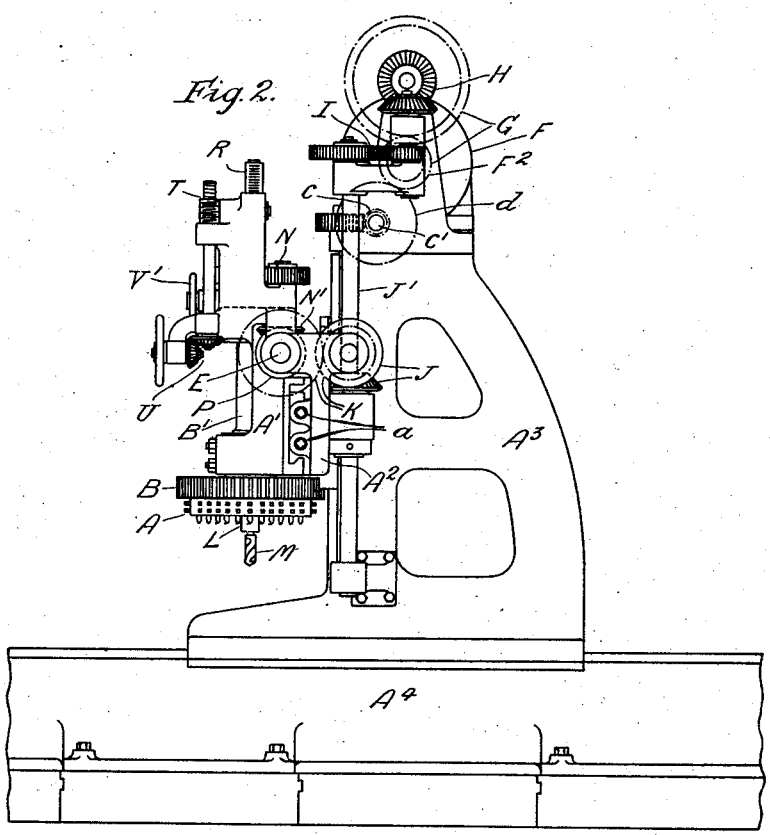
Figure 3:
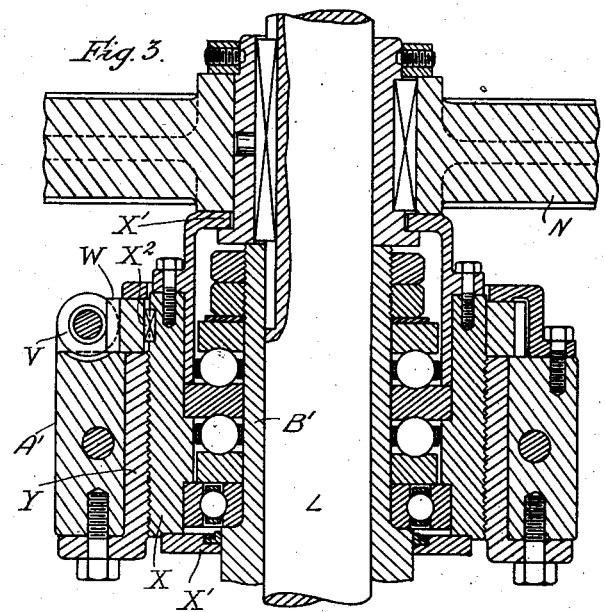
Figure 4:
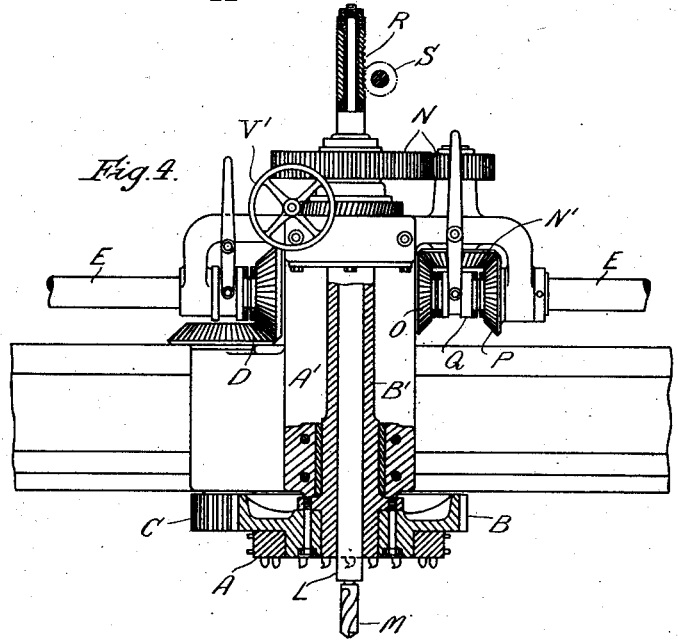

In the accompanying drawings Figures 1 and 2 are elevations at right angles to each other showing a preferred construction of the improved machine for milling and boring. Figs. 3 and 4 show on an enlarged scale details hereinafter referred to.

Referring to the drawings, the said machine is shown as equipped with two milling cutter wheels A disposed in the instance shown in a line at right angles to the direction of travel and adjustable relatively to one another, said cutter wheels A being driven by gear wheels from a common shaft.

As shown, the cutter wheels A are mounted on bracket members $A^1$ slidably connected to a supporting frame $A^2$ disposed transversely of, and adjustable vertically in relation to a framework which includes end standards $A^3$ and is adapted to be moved in a horizontal plane. Each cutter wheel is provided with a spur wheel B connected to a sleeve $B^1$ supported at its upper end by ball bearings (Fig. 3) in the bracket member $A^1$ and said spur wheel is engaged by a pinion C adapted to be rotated by clutch-controlled bevel gearing D from a shaft E which is supported on the frame $A^2$ and is driven from an electric motor F, supported by a cross beam $F^1$ connecting said standards $A^3$, through spur gearing G, bevel gearing H and spur gearing I mounted on one of the standards $A^3$, and through bevel gearing J and spur gearing K mounted on the frame $A^2$, the bevel wheel J on the driving shaft $J^1$ being slidable relatively to said shaft $J^1$ so as to permit of vertical adjustment of the frame $A^2$. Coaxially with each cutter wheel A is a spindle L carrying a drill M movable axially so as to project beyond the face of the corresponding cutter wheel, each drill spindle L being adapted to be driven through gearing at a higher speed than the corresponding cutter wheel A and being fitted relatively to the cutter wheel in such manner as to permit of proper feed of the drill spindles.

As shown particularly in Figs. 3 and 4, the drill spindle L passes co-axially through the sleeve $B^1$ and is adapted to be rotated by means of spur gearing N and a bevel wheel $N^1$ engaged by bevel wheels O and P freely mounted on the shaft E and having clutch faces adapted to be engaged one at a time by a sliding clutch Q, rotatable with said shaft E, according to the direction in which it is desired to rotate the drill spindle L. The feed mechanism for the spindle L may comprise, for example, a rack R (Figs. 1, 2 and 4) freely mounted on said spindle, and a pinion S which is operated by worm gearing T and by preferably manually-controlled bevel gearing U supported on the bracket member $A^1$.

As shown particularly in Fig. 3, axial adjustment of the cutter wheels is permitted by means of gearing comprising for example a worm V, operable by a hand wheel $V^1$, Fig. 1, and worm wheel W mounted on the bracket member $A^1$, said worm wheel W being adapted to rotate a sleeve X freely surrounding the sleeve $B^1$ and having flange connections therewith, as at $X^1$, which sleeve X is in screw-threaded engagement with a bush Y secured to the bracket member $A^1$ and has a feather-and-groove connection at $X^2$ with the worm wheel W, so that when the wheel W is rotated, the sleeve X is also rotated and moved axially relatively to the bush Y, thereby moving axially the sleeve $B^1$.

The bracket members $A^1$ are adapted to be adjusted horizontally by means of screw-threaded spindles $a$ rotatably mounted on the frame $A^2$, and the said frame $A^2$ is adapted to be adjusted vertically by means of screw-threaded spindles $b$ rotatably mounted on the standards $A^3$ and operated by worm gearing $c$ from a shaft $c^1$ supported on the cross beam $F^1$ and standards A³ and provided with a spur wheel $d$ adapted to be engaged by a sliding pinion F² driven from the electric motor F. The standards A³ and parts connected thereto are adapted to be moved relatively to stationary supporting ways A⁴ on the base of the machine by means of screw-threaded spindles $e$ mounted on the said supporting ways A⁴, which spindles $e$ are rotated by means of bevel gearing $f$ operated by a shaft $g$ which is driven by spur gearing $h$, bevel gearing $i$ and spur gearing $j$ from an electric motor $k$.

In the operation of the improved machine the supporting frame-work, comprising the end standards A³ and the supporting frame-piece or cross-bar A² mounted on said standards, will be caused to travel on the supporting ways A⁴; while the said supporting frame piece or cross bar A², on which the milling and boring devices are mounted, may be raised and lowered, in accordance with the requirements of the work, by the rotatable screws $b$. Also the bracket members A¹, directly supporting the milling and boring devices, may be adjusted to any desired positions in accordance with the requirements of the work on the said supporting frame-piece or cross-bar A². Also the drill spindles L, which are mounted concentrically or co-axially with the cutter wheels or milling devices A, are adapted to be fed vertically relative to said cutter wheels or milling devices, and are driven by a gearing mechanism which is adapted to impart very much higher rates of rotative speed thereto than is imparted to the said cutter wheels or milling devices. The driving connections of the rotating milling and boring devices with the driven shaft E are independent of each other so that when the milling devices are in operation the boring devices may be at rest, and vice versa, owing to the independent clutch connections of the gearing D, which drives the milling cutter, and the reversible gearing N, N¹, O and P, which drives the boring devices, with said shaft E. Also the milling and boring devices are fed vertically independently of each other by the manually operated means including the hand-wheels V¹ which are geared to the milling tools, and the hand-wheels which operate the gearing U connected to the drill spindles.

Owing to the manner in which the operating tools of this improved machine are mounted, and the means by which they may be caused to travel and may be adjusted, the machine is particularly adapted for milling and boring turbine casings, or other similar work, as hereinbefore indicated.

It will be understood that with a machine equipped with milling cutters and boring drills as above described it is possible to mill casings for turbines or the like during the travel of the tool in one direction and on the return motion to bore the milled surfaces.

Having now described my invention what I claim and desire to secure by Letters Patent of the United States is:—

1. In a milling and boring machine, the combination with supporting ways, A⁴, of a traveling frame-work comprising end standards and a frame-piece or cross-bar, A², connecting said standards, bracket members adjustably mounted on said frame-piece or cross-bar, milling devices rotatably supported by said bracket members, rotating boring devices also supported by said bracket members and arranged co-axially with said milling devices, means for causing said frame-work to travel on said supporting ways, means for adjusting said frame-piece or cross-bar A² vertically on the said end standards, and driving means for rotating said milling and boring devices.

2. A milling and boring machine comprising in combination a framework adapted to be moved in a horizontal plane, said framework including end standards, a frame extending transversely of said standards and adjustable vertically relatively thereto, bracket members adjustably connected to said frame, milling devices rotatable on vertical axes and mounted on said bracket members, and boring devices mounted on said bracket members arranged co-axially with said milling devices.

3. A milling and boring machine comprising in combination, a framework adapted to be moved in a horizontal plane, said framework including end standards, a frame extending transversely of said standards and adjustable vertically relatively thereto, bracket members adjustably connected to said frame, milling cutter wheels rotatable on vertical axes and mounted on said bracket members and adjustable axially relatively to said bracket members, and boring devices mounted on said bracket members arranged co-axially with said milling devices.

4. In a milling and boring machine, the combination with supporting ways, A⁴, of a traveling frame-work comprising end standards and a frame-piece or cross bar, A², connecting said standards, bracket members adjustably mounted on said frame-piece or cross-bar, milling devices rotatably supported by said bracket members, rotating boring devices also supported by said bracket members and arranged co-axially with said milling devices, means for causing said frame-work to travel on said supporting ways, means for adjusting said frame-piece or cross-bar A² vertically on the said end standards, means for adjusting said bracket members horizontally on said frame-piece or cross-bar, independent feeding mechanisms for the milling and boring devices, and driving means for rotating said milling and boring devices.

5. In a milling and boring machine, the combination with supporting ways, $A^4$, of a traveling frame-work comprising end standards and a frame-piece or cross-bar, $A^2$, connecting said standards, bracket members adjustably mounted on said frame-piece or cross-bar, milling devices rotatably supported by said bracket members, rotating boring devices also supported by said bracket members and arranged co-axially with said milling devices, means for causing said frame-work to travel on said supporting ways, means for adjusting said frame-piece or cross-bar $A^2$ vertically on the said end standards, and driving means for rotating said milling and boring devices, said driving means comprising a driven shaft, E, with which said milling and boring devices have independent connections so that the boring devices may be at rest when the milling devices are in operation, and vice versa, and the operating mechanism of the boring devices comprising reversing gearing.

6. In a milling and boring machine, the combination with supporting ways, $A^4$, of a traveling frame-work comprising end standards and a frame-piece or cross-bar, $A^2$, connecting said standards, bracket members adjustably mounted on said frame-piece or cross-bar, milling devices rotatably supported by said bracket members, rotating boring devices also supported by said bracket members and arranged co-axially with said milling devices, means for causing said frame-work to travel on said supporting ways, means for adjusting said frame-piece or cross-bar $A^2$ vertically on the said end standards, means for adjusting said bracket members horizontally on said frame-piece or cross-bar, independent feeding mechanisms for the milling and boring devices, and driving means for rotating said milling and boring devices, said driving means comprising a driven shaft, E, with which said milling and boring devices have independent connections so that the boring devices may be at rest when the milling devices are in operation, and vice versa, and the operating mechanism of the boring devices comprising reversing gearing.

In testimony whereof I have signed my name to this specification in the presence of two subscribing witnesses.

CHARLES FREDERICK SHANKS.

Witnesses:
WALLACE CRANSTON FAIRWEATHER,
JOHN TRAILL STEVENSON.

---

Copies of this patent may be obtained for five cents each, by addressing the "Commissioner of Patents, Washington, D. C."